(12) United States Patent
Chang et al.

(10) Patent No.: US 8,568,823 B2
(45) Date of Patent: Oct. 29, 2013

(54) METHOD FOR FORMING PATTERN AND METHOD FOR MANUFACTURING LIQUID CRYSTAL DISPLAY DEVICE

(75) Inventors: Jae-Hyuk Chang, Seongnam-si (KR); Seung-Jun Lee, Yongin-si (KR); Hyun-Seok Kim, Anyang-si (KR); Sung Hee Lee, Seoul (KR); Gug-Rae Jo, Asan-si (KR); Sin Kwon, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 295 days.

(21) Appl. No.: 13/010,719

(22) Filed: Jan. 20, 2011

(65) Prior Publication Data

US 2012/0033172 A1  Feb. 9, 2012

(30) Foreign Application Priority Data

Aug. 9, 2010  (KR) .......... 10-2010-0076619

(51) Int. Cl.
  *B05D 5/12*  (2006.01)
  *B05D 3/00*  (2006.01)
  *B05D 5/00*  (2006.01)

(52) U.S. Cl.
  USPC .......... 427/68; 427/271; 427/278; 427/277; 427/428.01; 427/248.19

(58) Field of Classification Search
  USPC .......... 427/428.01, 277, 278, 428.19, 68
  See application file for complete search history.

(56) References Cited

U.S. PATENT DOCUMENTS

| | | | |
|---|---|---|---|
| 6,443,571 B1 * | 9/2002 | Shinkoda et al. | 347/103 |
| 7,544,395 B2 | 6/2009 | Yoo | |
| 2003/0222950 A1 * | 12/2003 | Jeanmaire | 347/77 |
| 2005/0019185 A1 * | 1/2005 | Otis | 417/475 |
| 2006/0134841 A1 * | 6/2006 | Oh | 438/151 |
| 2006/0210720 A1 * | 9/2006 | Yoo | 427/428.01 |
| 2007/0065574 A1 * | 3/2007 | Rosati et al. | 427/207.1 |
| 2008/0173615 A1 | 7/2008 | Kim | |
| 2008/0264902 A1 * | 10/2008 | Song et al. | 216/43 |
| 2009/0215209 A1 * | 8/2009 | Anc et al. | 438/22 |
| 2010/0120181 A1 * | 5/2010 | Kim et al. | 438/27 |
| 2010/0157211 A1 * | 6/2010 | Kim et al. | 349/106 |
| 2010/0167439 A1 * | 7/2010 | Yoo et al. | 438/27 |

FOREIGN PATENT DOCUMENTS

| | | |
|---|---|---|
| JP | 2005-305743 | 11/2005 |
| JP | 2006-218721 | 8/2006 |
| JP | 2006-248139 | 9/2006 |
| JP | 2006-337952 | 12/2006 |
| JP | 2007-095517 | 4/2007 |
| JP | 2009-151035 | 7/2009 |
| KR | 1020080096030 | 10/2008 |
| KR | 1020090003883 | 1/2009 |
| KR | 1020090061183 | 6/2009 |
| KR | 1020090127694 | 12/2009 |

* cited by examiner

*Primary Examiner* — Michael Cleveland
*Assistant Examiner* — Austin Murata
(74) *Attorney, Agent, or Firm* — H.C. Park & Associates, PLC

(57) ABSTRACT

A method of forming a pattern and a manufacturing method of a liquid crystal display includes forming the pattern with a thin thickness by coating a pattern material on a printing roll using a nozzle, removing a surplus portion of the pattern material from the printing roll by using a plate, and transferring the pattern material remaining on the printing roll to a substrate to form the pattern.

22 Claims, 8 Drawing Sheets

METHOD FOR FORMING PATTERN AND METHOD FOR MANUFACTURING LIQUID CRYSTAL DISPLAY DEVICE

CROSS REFERENCE TO RELATED APPLICATION

This application claims priority from and the benefit of Korean Patent Application No. 10-2010-0076619, filed on Aug. 9, 2010, which is hereby incorporated by reference for all purposes as if fully set forth herein.

BACKGROUND OF THE INVENTION

1. Field of the Invention

Exemplary embodiments of the present invention relate to a method for forming a pattern and a method for manufacturing a liquid crystal display. More particularly, the present invention relates to a method for forming a pattern and a method for manufacturing a liquid crystal display having a thin pattern while reducing cost and preventing a coffee stain effect.

2. Discussion of the Background

Liquid crystal displays (LCDs) are one of the most widely used flat panel displays. An LCD includes a pair of panels provided with field-generating electrodes and a liquid crystal (LC) layer interposed between the two panels. The LCD displays images by applying signals to the field-generating electrodes to generate an electric field in the LC layer that determines the orientation of LC molecules therein to adjust polarization of incident light.

The liquid crystal display includes a thin film transistor array panel and a common electrode panel facing each other. The thin film transistor array panel typically includes a gate line transmitting a gate signal and a data line transmitting a data signal, a thin film transistor connected to the gate line and the data line, and a pixel electrode connected to the thin film transistor. The gate line and the data line cross within the thin film transistor array panel. The common electrode panel may include a light blocking member, a color filter, and a common electrode.

As described above, two panels of the liquid crystal display include a plurality of patterns, and these patterns are generally formed through a photo-process and an etching process. However, a mask with a predetermined pattern is often used for these processes and increases the manufacturing cost and process time because of complicated process steps involved with production and use of the mask.

To solve these problems, methods for forming the pattern by using a printing method have been proposed. For example, there are various methods such as inkjet printing, nano-imprinting, gravure printing, reverse offset printing, offset printing, and micro-contact printing.

Among printing techniques, in the commonly used reverse offset printing and offset printing, a pattern material is coated on the whole surface of a printing roll, and then only the desired pattern is maintained and transferred to the substrate. However, when the pattern material is coated on the whole surface of the printing roll and the unnecessary portion is subsequently removed, the removed pattern materials may be expensive. The removed pattern materials cannot be re-used; therefore, a financial loss is realized. Also, it is difficult to uniformly coat the pattern material on the whole surface of a large area, and forming a thin coat is also difficult.

Another method of directly forming the pattern on the substrate is using a small nozzle. Here, an additional process for forming a depression in the substrate may be required, and a thick edge portion of the pattern may generate a coffee stain effect.

The information in this section is only for enhancement of understanding of the background of the invention, and it may contain information that does not form the prior art.

SUMMARY OF THE INVENTION

Exemplary embodiments of the present invention provide a method for forming a pattern, and a liquid crystal display capable of being formed with a pattern having a thin thickness.

Exemplary embodiments of the present invention also provide a method for forming a pattern and a liquid crystal display that reduces process cost by coating a pattern material on a portion of a substrate for pattern formation.

Exemplary embodiments of the present invention additionally provide a method for forming a pattern and a liquid crystal display that may have a pattern formed without an additional depression for pattern forming material and that may prevent a coffee stain effect in deposited pattern forming material.

Additional features of the invention will be set forth in the description that follows and, in part, will be apparent from the description or may be learned by practice of the invention.

An exemplary embodiment of the present invention discloses a method of forming a pattern. The method comprises coating a material on a roll using a nozzle; removing a first portion of the material using a plate and leaving a second portion of the material on the roll; and transferring the second portion from the roll to a substrate to form the pattern.

An exemplary embodiment of the present invention also discloses a method of manufacturing a liquid crystal comprising a first substrate and a second substrate comprising a plurality of patterns, where the method of forming the plurality of patterns comprises coating a pattern material on a printing roll using a nozzle; removing a portion of the pattern material using a plate; and transferring the pattern material remaining on the printing roll to a substrate.

An exemplary embodiment of the present invention additionally discloses a method of forming a pattern. The method comprises delivering a material to a roll using a nozzle; removing a first portion of the material using a plate and leaving a second portion of the material on the roll; and transferring the second portion from the roll to a substrate to form the pattern. The nozzle modulates delivery of drops of uniform size and shape of the material to the roll.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE ILLUSTRATED EMBODIMENTS

Figure 1A:
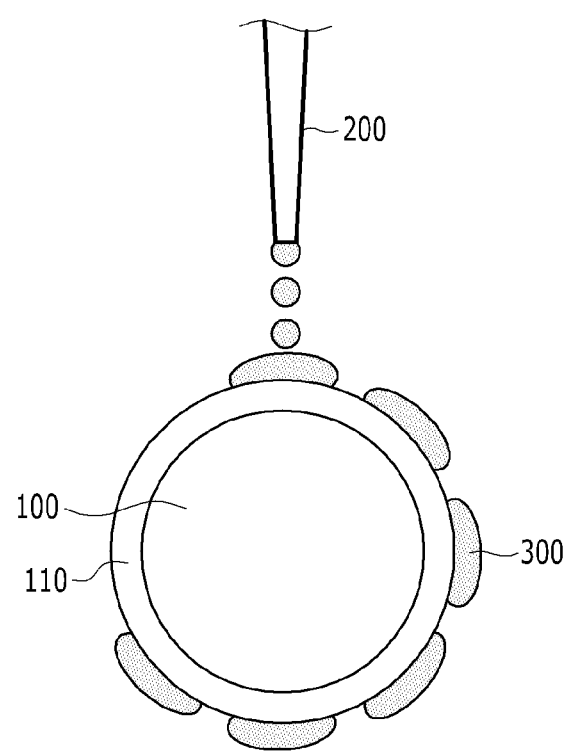
FIG. 1A, FIG. 1B, and FIG. 1C show cross-sectional views of a method of forming a pattern according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, or directly coupled to the other element or layer, or intervening elements or layers may be present. In contrast, when an element is referred to as being "directly on," "directly connected to," or "directly coupled to" another element or layer, there are no intervening elements or layers present.

Hereinafter, a pattern formation method according to an exemplary embodiment of the present invention will be described with reference to the accompanying drawings.

Figure 1B:
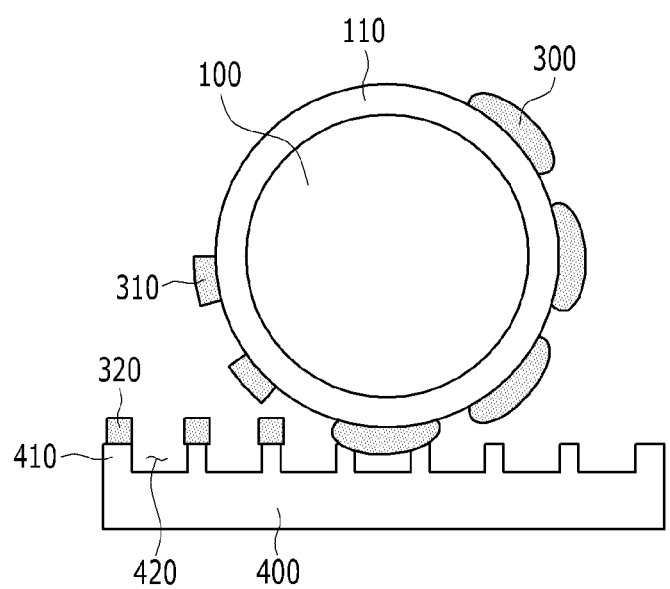
Figure 1C:
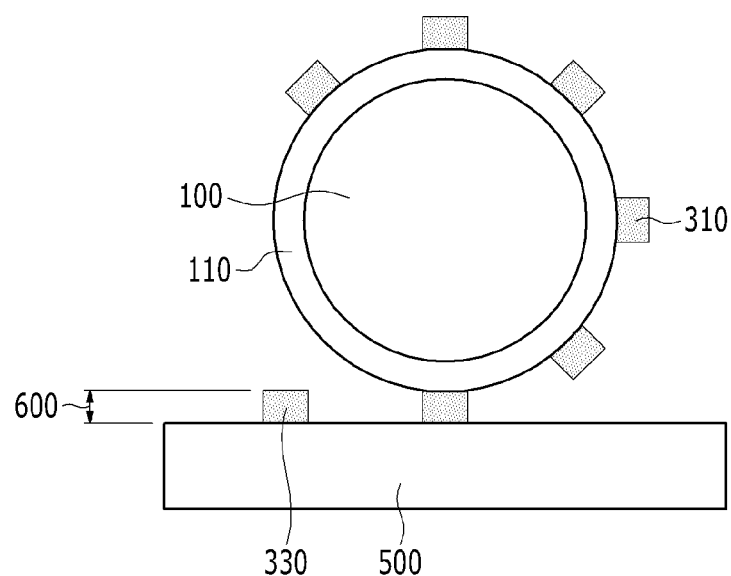
Figure 2A:
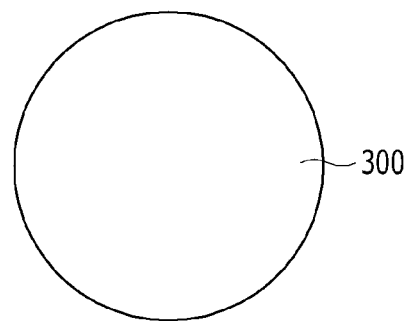
FIG. 2A shows a plan view of a pattern material coated on a printing roll.
Figure 2B:
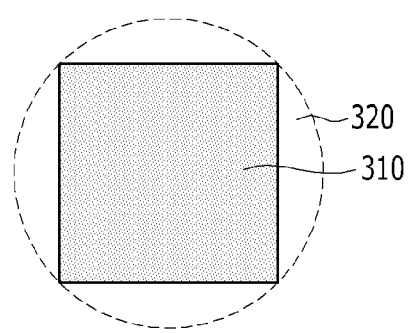
FIG. 2B shows a plan view of a residual portion of pattern material that is maintained on a printing roll for pattern formation.

FIG. 1A, FIG. 1B, and FIG. 1C show cross-sectional views of a method of forming a pattern according to an exemplary embodiment of the present invention. FIG. 2A shows a plan view of a pattern material coated on a printing roll, and FIG. 2B shows a plan view of a residual portion of a pattern material maintained on a printing roll for pattern formation.

In a method for forming a pattern according to an exemplary embodiment of the present invention, as shown in FIG. 1A, a pattern material 300 is coated on a printing roll 100 by a nozzle 200. The nozzle 200 emits the pattern material 300 onto the exterior portion of the printing roll 100 as the printing roll 100 is rotated. The printing roll 100 may include a blanket 110 covering the surface of the printing roll 100, and the pattern material 300 may be coated on the blanket 110.

Conventionally, the pattern material 300 is coated on the whole surface of the printing roll 100 by using a slit nozzle or by using a doctor blade (not shown) to spread the pattern material 300 across the whole surface of the printing roll 100. In an exemplary embodiment of the present invention, the nozzle 200 emits the pattern material 300 so that the pattern material 300 is incident at the printing roll 100 corresponding to the portion where a pattern will be formed on a substrate. Accordingly, the amount of the pattern material 300 used for pattern formation is smaller compared with the conventional method.

Here, the pattern material 300 is coated onto the blanket 110 with an upper surface shown in FIG. 2A. The pattern material 300, which is emitted from the nozzle 200 and dripped onto the printing roll 100, has a surface with a curved shape as shown by the cross-section in FIG. 1A. Here, the pattern material 300 does not have a well-defined edge since it may tend to spread out on the blanket 110. Due to the curvature, the pattern material 300 coats a portion of the substrate surrounding the pattern to be formed such that the completed shape of the pattern is not clearly defined, thereby reducing resolution of the pattern.

Next, as shown in FIG. 1B, a residual portion 310 of the pattern material 300 in the pattern formation is maintained on the printing roll 100 by using a coupling/decoupling plate 400, which removes a surplus portion 320 of the pattern material 300.

The upper surface of the coupling/decoupling plate 400 includes a protrusion 410 and a recess 420. As the printing roll 100 is rotated so that the pattern material 300 contacts the protrusion 410, the surplus portion 320 attaches to the protrusion 410 and detaches from the blanket 110. The pressure applied by the coupling/decoupling plate 400 against the blanket 110 or the pattern material 300 may vary and may be optimized for removal of the surplus portion 320. The pressure may be determined based on the desired resolution of the pattern formation.

Here, the depth of the recess 420 of the coupling/decoupling plate 400 may be sufficiently deep such that the residual portion 310 is not attached to the coupling/decoupling plate 400 at the bottom of the recess 420. If the recess 420 is too shallow, the residual portion 310 may attach to the recess 420 and may be removed from the blanket 110 as the printing roll 100 is rotated.

A surface of the residual portion 310 on the printing roll 100 is described with reference to FIG. 2B. If the surplus portion 320 that surrounds the pattern formation is removed, the residual portion 310 for the pattern formation obtains the desired shape. That is, coated pattern material 300 having an initial shape that does not quite match the desired pattern formation is initially formed by using the nozzle 200 to emit the pattern material 300 onto the printing roll 100. Thereafter, the surplus portion 320 is removed by using the coupling/decoupling plate 400 to form the pattern with the desired shape.

Next, as shown in FIG. 1C, the printing roll 100 is rotated with respect to the substrate 500 to transfer the residual portion 310 from the printing roll 100 to the substrate 500, thereby forming the pattern 330.

Next, if the pattern 330 transferred to the substrate 500 is hardened, the final thickness 600 of the pattern may range from about 20 nm to 50 nm. Consequently, a thin pattern 330 may be realized compared with the coating the pattern material on the whole surface of the substrate by using the conventional slit nozzle or a doctor blade.

Next, an appropriate diameter of the nozzle, a frequency for a piezoelectric converter to modulate the nozzle, and the emitting speed and viscosity of the pattern material is described.

Figure 3A:
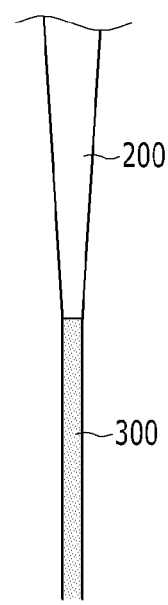
FIG. 3A, FIG. 3B, and FIG. 3C show side views of a pattern material emitted from a nozzle.
Figure 3B:
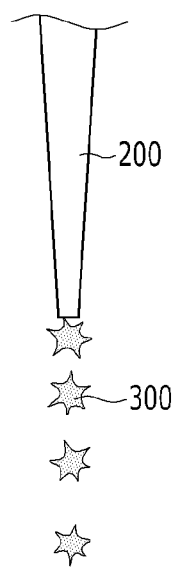
Figure 3C:
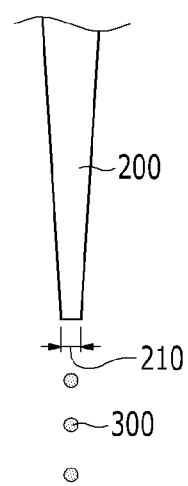

FIG. 3A, FIG. 3B, and FIG. 3C show cross-sectional views of a pattern material emitted from a nozzle.

In FIG. 3A, the pattern material 300 is continuously emitted from the nozzle 200, and in FIG. 3B, the pattern material 300 having an irregular shape and size is emitted from the nozzle 200.

As an alternative to continuous or irregularly shaped emissions, the diameter of the nozzle 200, the frequency of a piezoelectric converter (not shown), and the emitting speed and viscosity of the pattern material may be optimized to tune the shape and regularity of the emitted pattern material. As shown in FIG. 3C, the pattern material 300 having a uniform shape and size is emitted from the nozzle 200 using the appropriate parameters.

The nozzle diameter 210 used for the pattern formation in the present exemplary embodiment may gradually decrease near its opening aperture. For example, the shape of the nozzle may be tapered. Here, if the diameter 210 of the end portion of the nozzle 200 is very large, the pattern material 300 may be continuously emitted such that the pattern material 300 may not be coated in the desired portion. On the other hand, if the diameter 210 at the end of the nozzle 200 is very small, the nozzle 200 constricts the flow of the pattern material 300 so as not to be emitted from the nozzle 200, which leads to clogging of the nozzle 200.

Accordingly, the diameter 210 of the end portion of the nozzle 200 may range from 0.1 μm to 100 μm.

Although not shown, the nozzle 200 may include a piezoelectric converter oscillating the end portion of the nozzle 200 such that the pattern material 300 is intermittently emitted, i.e., a modulated amount of pattern material 300 is emitted by the nozzle 200. If the pattern material 300 is a liquid, a small diameter stream of pattern material 300 may flow from the nozzle 200. As the tip of the nozzle 200 oscillates, the stream of pattern material 300 is interrupted, and the emitted volumes of pattern material 300 form drops of uniform size.

Here, the frequency of the piezoelectric converter may range from 10 kHz to 30 kHz. Also, the emitting speed, i.e., the volumetric flow rate, of the pattern material 300 may range from 0.1 μL is to 100 μL/s, and the viscosity of the pattern material 300 may range from 1 is cp to 11 cp.

If the nozzle diameter 200 is too large, the pattern material 300 may continuously flow from the nozzle 200 or may have a non-uniform shape and size.

Now, the pattern formed by the pattern formation method according to an exemplary embodiment of the present invention is described.

Figure 4A:
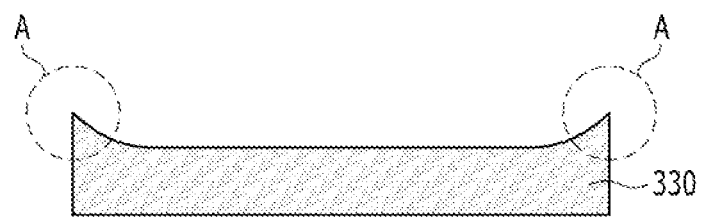
FIG. 4A is a cross-sectional view of a pattern formed on a substrate by using a nozzle.
Figure 4B:
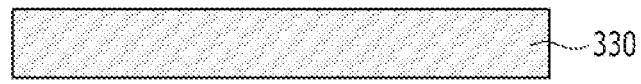
FIG. 4B is a cross-sectional view showing a pattern formed by a pattern formation method according to an exemplary embodiment of the present invention.

FIG. 4A shows a cross-section of a pattern formed on a substrate by using a conventional method, and FIG. 4B shows a cross-section of a pattern formed by an exemplary embodiment of the present invention.

When the pattern 330 is formed directly on the substrate by using a conventional nozzle, as shown in FIG. 4A, a coffee stain effect A may be generated where the thickness of the edge portion is greater than the thickness of the central portion of the pattern. This is because the depression to prevent the pattern material from being formed anywhere but the desired pattern region is formed on the substrate, and the pattern material is coated inside the depression, which may establish a negative meniscus.

In the present exemplary embodiment for the method of forming the pattern 330, the pattern material is coated on the printing roll, the surplus portion is removed by using the coupling/decoupling plate, and then the residual portion is transferred to the substrate. As shown in FIG. 4B, a pattern 330 having a uniform thickness from the center to the edge may be formed.

The method for forming the pattern according to an exemplary embodiment of the present invention may be applied to form various patterns. For example, to form a liquid crystal display, which may include an organic light emitting device and a semiconductor, a plurality of patterns is formed on a substrate. The pattern material is coated on a printing roll by using a nozzle. A surplus portion from the pattern material is removed from the printing roll by using a coupling/decoupling plate, and then the pattern material remaining on the printing roll is transferred to the substrate to form the pattern.

The liquid crystal display includes a first substrate and a second substrate with a liquid crystal layer interposed therebetween. A gate line transmitting a gate signal and a data line transmitting a data signal are formed and cross in separate and insulated layers on the first substrate, and a thin film transistor connected to the gate line, the data line, and the pixel electrode connected to the thin film transistor may be formed. A light blocking member, a color filter, and a common electrode may be formed on the second substrate.

When forming the plurality of patterns such as the gate line, the data line, the thin film transistor, the pixel electrode, the light blocking member, the color filter, and the common electrode of the liquid crystal display, the method for forming the pattern according to the present invention may be applied.

In the exemplary embodiments above, the nozzle material may be selected so that the pattern material is not wicked by the nozzle. Moreover, the nozzle material may repel the pattern material to effect efficient delivery of the pattern material to the printing roll.

In another exemplary embodiment of the present invention, the pattern material may be delivered to the printing roll by a nozzle connected to a peristaltic fluid flow system. Here, instead of using a piezoelectric converter as in a previous exemplary embodiment, drops of the pattern material may be formed through peristaltic delivery of the pattern material to the terminus of the nozzle. In the peristalsis, fluid flow to the terminus of the nozzle is mechanically interrupted, thereby allowing emission of a drop of the pattern material from the nozzle. In the present exemplary embodiment, the nozzle diameter need only be large enough to emit the drop of pattern material, and no mechanical oscillation of the nozzle tip need occur.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of forming a pattern, the method comprising:
 disposing a material on a roll using a nozzle;
 removing a first portion of the material using a plate, thereby, leaving a second portion of the material on the roll; and
 transferring the second portion from the roll to a substrate to form the pattern,
 wherein the material is discontinuously disposed on the roll prior to removing so as to correspond to the pattern formed on the substrate.

2. The method of claim 1, wherein a diameter of an aperture of the nozzle ranges from 0.1 μm to 100 μm.

3. The method of claim 1, wherein the nozzle comprises a piezoelectric unit to oscillate a terminus of the nozzle that emits the material.

4. The method of claim 3, wherein the frequency of the piezoelectric unit ranges from 10 kHz to 30 kHz.

5. The method of claim 3, wherein a volumetric flow rate of the material ranges from 0.1 μL/s to 100 μL/s.

6. The method of claim 1, wherein a viscosity of the material ranges from 1 cp to 11 cp.

7. The method of claim 1, further comprising rotating the roll while disposing the material on the roll.

8. The method of claim 1, wherein an upper surface of the plate comprises a protrusion and a recess, and
 the first portion is separated from the roll and is attached to the plate in response to the roll being rotated on the upper surface of the plate.

9. The method of claim 1, wherein the pattern is formed in response to the roll being rotated on the substrate.

10. The method of claim 1, wherein the roll comprises a blanket covering the roll, and the material is disposed on the blanket.

11. A method of manufacturing a liquid crystal display comprising a first substrate and a second substrate comprising a plurality of patterns, the method of forming the plurality of patterns comprising:
- disposing a pattern material on a printing roll using a nozzle;
- removing a portion of the pattern material using a plate; and
- transferring the pattern material remaining on the printing roll to the first and second substrates to form the plurality of patterns,
- wherein the material is discontinuously disposed on the roll prior to removing so as to correspond to the plurality of patterns formed on the first and second substrates.

12. A method of forming a pattern, the method comprising:
- disposing a material on a roll using a nozzle;
- removing a first portion of the material using a plate, thereby, leaving a second portion of the material on the roll; and
- transferring the second portion from the roll to a substrate to form the pattern,
- wherein the nozzle delivers drops of uniform size and uniform shape of the material to the roll, and
- wherein the material is discontinuously disposed on the roll prior to removing so as to correspond to the pattern.

13. The method of claim 12, wherein a diameter of an aperture of the nozzle ranges from 0.1 μm to 100 μm.

14. The method of claim 12, wherein the nozzle comprises a piezoelectric unit to oscillate a terminus of the nozzle that emits the material.

15. The method of claim 14, wherein a frequency of the piezoelectric unit ranges from 10 kHz to 30 kHz.

16. The method of claim 14, wherein a volumetric flow rate of the material ranges from 0.1 μL/s to 100 μL/s.

17. The method of claim 12, wherein a viscosity of the material ranges from 1 cp to 11 cp.

18. The method of claim 12, further comprising rotating the roll while disposing the material on the roll.

19. The method of claim 12, wherein an upper surface of the plate comprises a protrusion and a recess, and
- the first portion is separated from the roll and attached to the plate in response to the roll being rotated on the upper surface of the plate.

20. The method of claim 12, wherein the pattern is formed in response to the roll being rotated on the substrate.

21. The method of claim 12, wherein the roll comprises a blanket covering the roll, and the material is disposed on the blanket.

22. The method of claim 12, wherein the nozzle comprises a peristaltic unit to modulate the delivery of the material from the nozzle.

* * * * *